Patented Oct. 27, 1942

2,299,839

UNITED STATES PATENT OFFICE 2,299,839

POLYMERIC MATERIALS

David M. McQueen, Wilmington, Del., assignor to E. I. du Pont de Nemours & Company, Wilmington, Del., a corporation of Delaware No Drawing. Application September 25, 1939, Serial No. 296,494

14 Claims. (Cl. 18—48)

This invention relates to polymeric materials and more particularly to treatment of synthetic linear polyamides.

This invention has as an object a process for modifying the properties of synthetic linear polyamides. A further object is a process for decreasing the solubility of water-soluble polyamides. A further object is to raise the melting point of these polyamides. A further object is the production of new and useful compositions of matter. Still another object is the preparation of filaments, ribbon, films and the like. Other objects will appear hereinafter.

These objects are accomplished by a process which comprises treating a water-soluble synthetic linear polyamide with an insolubilizing agent comprising an ionizable salt containing a metal having a valence greater than 2 or capable of being oxidized to such valence. The treatment is preferably applied to the polyamide in the form of films, fibers, bristles and the like, after which the article is baked below the melting point of the polyamide, or in the case of photo-sensitive salts, the article is exposed to ultraviolet light.

The synthetic linear polyamides referred to above are of the general type described in Patents 2,071,250, 2,071,253, and 2,130,948. The polyamides with which this invention is concerned are those of this type which are water soluble. By "water-soluble polyamides" is meant those polyamides which are soluble either in water alone or in aqueous alcohol solutions. The term "polyamide" refers not only to the polyamides obtained from polyamide-forming reactants alone (including the interpolyamides obtained from mixtures of these reactants) but also to linear polymers containing a plurality of amide groups as an integral part of the main chain of atoms, as for instance, the ester-amide interpolymers.

Water-soluble polyamides particularly well adapted to the practice of this invention are found in the class of polyamides which contain hetero atoms of the oxygen family and which are described in Patents 2,158,064 and 2,191,556. These polyamides, some of which are very soluble in water, represent a large class. For example, it is possible to make polyamides in which the diamine represented contains the hetero atom, polyamides in which the dibasic acid represented contains the hetero atom, and polyamides in which both the diamine and dibasic acid represented contain hetero atoms. It is also possible to make polyamides in which only part of the diamine or dibasic acid reactant is of the hetero atom type. A mixture of diamines and/or dibasic acids can also be used in preparing interpolyamides. Other bifunctional reactants, such as amino acids, hydroxy acids, and glycols, can also be used in conjunction with the diamines and dibasic acids.

Another useful type of water-soluble polyamide is prepared by the interpolymerization of hexamethylene diammonium adipate with epsilon-aminocaproic acid, or their equivalents, preferably in a ratio of 40:60 parts by weight. This interpolymer is soluble in aqueous alcohol and from this solution can be readily cast into films which are further given the insolubilizing treatment of this invention.

In carrying out the invention with polyamides soluble in water alone, the usual practice is to cast the film from solution, drying the film under ordinary conditions of temperature and humidity, coating or impregnating the film with a saturated aqueous solution of the insolubilizing agent, and then baking the film. One or more coats may be applied with a brush or spray after which the film is baked from 8 to 16 hours at about 100°–120° C. In the case of solutions of the polyamide in aqueous alcohol or miscible solutions of water with other organic solvents, the insolubilizing agent is added as such, or in solution in the same solvent, to the polyamide solution just prior to casting the film, or the agent is added to the film after casting but before it has dried. The film may also be dipped momentarily in the solution of the insolubilizing agent, or in the agent itself, provided the agent is capable of swelling and penetrating the film. Generally the insolubilizing agent is applied in excess. The application softens and swells the film, and may even partially dissolve it. This permits adequate penetration and allows insolubilization to be effected in the subsequent heating or radiation step.

Polyamides referred to hereinafter are prepared by heating a salt of a dibasic acid and a diamine or by other methods described in Patent 2,130,948, or by polymerizing an amino acid or an amide-forming derivative thereof, as described in Patent 2,071,253. Interpolyamides are prepared by using more than one polyamide-forming composition, e. g., a mixture of diamine-dibasic acid salts. The polyamides prepared from the polymer-forming compositions listed below and referred to by the letters A to I, were used in the following examples illustrating the practice of this invention.

COMPOSITION

A. 85% triglycoldiamine-adipic acid—15% hexamethylenediamine-adipic acid.
B. 70% triglycoldiamine-adipic acid—30% hexamethylenediamine-diglycolic acid.
C. 90% triglycoldiamine-adipic acid—10% decamethylenediamine-sebacic acid.
D. 90% triglycoldiamine-adipic acid—10% hexamethylenediamine-adipic acid.
E. 90% triglycoldiamine-adipic acid—10% hexamethylenediamine-sebacic acid.
F. 85% triglycoldiamine-adipic acid—15% hexamethylenediamine-sebacic acid.
G. 100% triglycoldiamine-adipic acid.
H. 60% hexamethylenediamine-adipic acid—40% caprolactam.
I. 50% PVA and 50% of composition G (PVA=polyvinyl alcohol).

The percentage compositions refer to the parts by weight of the salt in the polymer-forming compositions in the reactive mixture before polymerization was effected. The polyamides (including interpolyamides) and their copolymers were made into 10% aqueous solutions by weight.

EXAMPLE I

Films cast from aqueous solutions of compositions A, B, and C are insolubilized by treatment with aluminum sulfate and with aluminum acetate. In applying these reagents, an excess of a saturated aqueous solution of the salt is coated on the films. The treated films are then baked overnight at 100° C. After the films have cooled to room temperature, they are immersed in water at 25° C. Table I gives the length of time for complete solution of untreated films, and the length of time for partial solution or crumbling for the treated films. It is apparent that the treatment has a marked insolubilizing action.

TABLE I

*Insolubilization of films*

| Insolubilizing agent | A | B | C |
|---|---|---|---|
|  | Minutes | Minutes | Minutes |
| Al$_2$(SO$_4$)$_3$ | 25 | 28 |  |
| Al(OOCH$_3$)$_3$ | 45 | 28 | 27 |
| Control (untreated film) | 5 | 10 | 16 |

EXAMPLE II

A 10% aqueous solution of composition B is mixed with an equal volume of aqueous 5% ammonium dichromate and is cast into films on two glass plates. The films are allowed to dry in the dark. After they are dry, one-half of each film is covered with tinfoil and the films are exposed to ultraviolet light. After such exposure, the films are immersed in water at 25° for 72 hours. The unexposed portions of the films dissolve rapidly whereas the exposed parts are not dissolved at the end of 72 hours.

EXAMPLE III

Interpolyamides of compositions A, D, and E, are cast into films and a saturated aqueous solution of ammonium dichromate is applied to each by means of a paintbrush. The films are then baked at 150°–160° C. for 16 hours in an atmosphere of nitrogen. The treated films do not dissolve when immersed in boiling water for 5 minutes, whereas the control film (untreated) dissolves almost immediately in water at 90° C.

EXAMPLE IV

Interpolyamide composition E is dissolved in water and cast into films on glass plates. Two parts by weight of interpolyamide is used in preparing each film. Two parts by weight of a metal salt, indicated below, dissolved in 15 parts of water is added to each plate before the films are completely dry. The films are then permitted to dry at room temperature and are finally baked at 100° C. for 16 hours. The following salts are used: borax, manganese chloride, cobalt chloride, lead diacetate, nickel sulfate, ferric chloride, zirconium sulfate, and bismuth trichloride. The salts in a valence state of 2 but capable of being oxidized to a higher valency show some ability to effect insolubilization, but those having a valency of 3 or more showed marked aptitude in effecting insolubilization. For example, films treated with ferric chloride and bismuth trichloride did not dissolve even after immersion in water at 25° C. for a period of 24 hours. All the other films crumbled within a period of 10–27 minutes without completely dissolving, whereas the untreated films dissolved completely in 5 minutes.

EXAMPLE V

Composition H dissolved in 50% aqueous ethanol, so as to obtain a 20% solution by weight, is mixed with a 10% alcoholic solution of ferric chloride, and films are cast from this homogeneous solution. The films are baked for 8 hours at a temperature of 120° C. The films are then immersed in 50% aqueous ethanol at a temperature of 65° C. The control film dissolves in 30–40 minutes, whereas the treated film shows no signs of solution at the end of 4 hours in this ethanol bath. The melting point of the treated film is 180°–190° C., whereas the untreated film melted at 175°–180° C.

EXAMPLE VI

Composition G is made into a 10% aqueous solution and is cast into films. These are treated with aqueous solutions of ferric chloride and ammonium dichromate. A 10% solution of composition I is also cast into a film and coated with an excess of ammonium dichromate. The films are baked for 8 hours at 120° C. All the films show marked insolubility and elevation in the melting point, as illustrated in Table II.

TABLE II

*Increase of melting point of films*

| Insolubilizing agent | Composition | M. P. of treated film | M. P. of untreated film |
|---|---|---|---|
| Ferric chloride | G | Above 300 | 179 |
| Ammonium dichromate | G | do | 179 |
| Ammonium dichromate | I | do | ca. 200 |

EXAMPLE VII

To 120 parts of a 10% aqueous solution of interpolyamide composition D is added 15 parts of a 14% aqueous solution of ammonium dichromate. The aqueous mixture is flowed on photolithographic zinc plates in a dark room and allowed to dry. When dry, the plates are covered with a piece of heavy paper in which letters have been cut. The plates are then exposed to ultraviolet light for two minutes. The exposed portions of the polymer coated plates, i. e., the portion exposed by the letters in the paper, become essentially insoluble whereas the unexposed portions remain soluble. One plate is then washed to remove the soluble portions of the polymer film leaving the insoluble portions (letters) intact. While still wet, this plate is smeared gently with a varnish ink prepared by grinding lead chromate in linseed oil. The ink adheres only to the photo-insolubilized letters that remain after the working step. The initials were then printed on paper by squeegeeing a piece of paper on the plate. Another plate after exposure to ultraviolet light (through the initial stencil) is coated completely with a thin film of the varnish ink before washing and is then immersed in water. The polymer and ink are thereby removed except on the photohardened section. This plate could then be used in printing as described for the first plate.

In another modification the partially exposed plates are treated with dilute nitric acid. This treatment causes the unexposed portion of the plate to be etched, whereas the exposed portion is protected by the insolubilized polyamide which acts as a resist material. This procedure is useful in various photomechanical printing processes such as photoengraving and photolithography. The plates may be made of other metals than zinc, e. g., aluminum and copper.

The present process may be advantageously carried out with mixtures of the polyamides and other types of polymers compatible therewith and with the aqueous solvent. These modified compositions, in addition to the polyamide, may comprise for instance products such as polyvinyl alcohol, polyvinyl alcohol-boric acid complex, partially acetalized polyvinyl alcohol, partially hydrolyzed polyvinyl acetate, polymethacrylamide, and water soluble interpolymers of styrene with other vinyl compounds.

The ionizable metal salts used in the practice of this invention are salts containing metals falling within groups III to VIII of the periodic table. The most effective of these agents are salts containing metals in groups V to VIII.

Reaction of the ionizable salts with the polyamides occurs at comparatively low temperatures but a temperature of at least 75° to 80° C. is desirable to make the reaction feasible from a time standpoint. As long as the reaction is carried out under non-oxidizing conditions, e. g., in an atmosphere of nitrogen, temperatures just short of the decomposition temperature or melting point of the polyamide composition may be used. Temperatures ranging from 100° to 120° C. are especially suitable, for insolubilization can be effected without the necessity of protecting the films with nitrogen to prevent discoloration. The films are generally insolubilized within 8 hours' baking. Considerable alteration in solubility can be obtained in only 1 or 2 hours, but baking for 8 to 16 hours is somewhat more effective and prolonged baking does not have any deleterious effect on the final product. When ultraviolet light is used to effect insolubilization, e. g., in connection with alkaline dichromates as described in Examples II and VII, only a short exposure is necessary.

The polyamides are preferably treated while in pellicular form with the insolubilizing ionized metal salts. The treatment may, however, be applied to other polyamide articles such as ribbons, bristles, fibers, fabrics, and massive molded forms.

Examples of other polyamides suited to the practice of this invention include such water-soluble polyamides as polytriglycol sebacamide, polytriglycol suberamide, and polytriglycol azelamide, polytriglycol diglycolicamide, and polytriglycol beta-methyl adipamide. Interpolyamides derived by cojoint polymerization of the polyamide-forming compositions which yield the foregoing water-soluble polyamides and such polyamide-forming compositions as hexamethylene diammonium adipate, hexamethylene diammonium sebacate, decamethylene diammonium adipate, 6-aminocaproic acid, 11-aminoundecanoic acid, may be used.

This invention is particularly valuable in connection with the coating and impregnation arts. The present process makes possible the deposition of films or protective coatings of the polyamide, which may be subsequently insolubilized, on wire and on fabrics such as cloth, paper, leather, etc. A noteworthy feature of this invention is the fact that the melting point of the polyamide or polyamide composition used is markedly raised. The present process is also useful in the preparation of insoluble films for use in photography, photomechanical reproductions, and lithography. More specific examples of such uses are offset printing, silk-screen printing, duplicating pads, and manifold stencil sheeting coatings.

As many apparently widely different embodiments of this invention may be made without departing from the spirit and scope thereof, it is to be understood that I do not limit myself to the specific embodiments thereof except as defined in the appended claims.

I claim:

1. In a process for decreasing the solubility of a water-soluble synthetic linear polyamide article presenting a large surface area, the step consisting of treating said article with an ionizable salt of a metal falling within groups III to VIII of the periodic table.

2. A process which comprises heating a composition comprising a water-soluble synthetic linear polyamide article presenting a large surface area and an ionizable salt of a metal falling within groups III to VIII of the periodic table.

3. A process which comprises exposing to radiant energy an article comprising a water-soluble synthetic linear polyamide and an ionizable salt of a metal falling within groups III to VIII of the periodic table.

4. A process which comprises exposing to ultraviolet light an article comprising a water-soluble synthetic linear polyamide and a photosensitive ionizable salt of a metal falling within groups III to VIII of the periodic table.

5. The process set forth in claim 2 in which said composition is treated in pellicular form with said salt.

6. The process set forth in claim 3 in which said composition is treated in pellicular form with said salt.

7. The process set forth in claim 4 in which said salt is an alkaline dichromate.

8. The process set forth in claim 4 in which said salt is ammonium dichromate.

9. A process which comprises exposing to radiant energy selected areas of an article comprising a water-soluble synthetic linear polyamide and an ionizable salt of a metal falling within groups III to VIII of the periodic table.

10. A process which comprises adding to a solution of water-soluble synthetic linear polyamide an ionizable salt of a metal falling within groups III to VIII of the periodic table, forming said solution into an article comprising said polyamide and salt, and baking said article.

11. A continuous self-supporting film comprising a water-soluble synthetic linear polyamide and an insolubilizing agent comprising an ionizable salt of a metal falling within groups III to VIII of the periodic table.

12. A film sensitive to radiant energy comprising a photo-sensitive salt and a synthetic linear polyamide, said polyamide constituting the sole film-forming material in said film.

13. A film sensitive to radiant energy which comprises an intimate mixture of a photo-sensitive salt and a synthetic linear polyamide.

14. A process for making polyamide articles which comprises extruding a solution of water-soluble synthetic linear polyamide in the form of the desired article and then heating the article with an ionizable salt of a metal falling within groups III to VIII of the periodic table until the article is substantially insoluble in water.

DAVID M. McQUEEN.